United States Patent

[11] 3,554,222

| [72] | Inventors | Shiso Kihara<br>Kobe-shi;<br>Hiroshi Nosaka, Akashi-shi; Takuji<br>Koyama, Kobe-shi, Japan |
|---|---|---|
| [21] | Appl. No. | 830,011 |
| [22] | Filed | June 3, 1969 |
| [45] | Patented | Jan. 12, 1971 |
| [73] | Assignee | Mitsubishi Jukogyo Kabushiki Kaisha<br>Tokyo, Japan |
| [32] | Priority | June 4, 1968 |
| [33] | | Japan |
| [31] | | 43/37789 |

[54] AUTOMATIC FLOW CONTROL VALVE
9 Claims, 4 Drawing Figs.

[52] U.S. Cl. .................................................. 137/501,
251/205
[51] Int. Cl. .................................................. G05d 7/00
[50] Field of Search ........................................... 137/494,
484.6, 484.8, 497, 500, 501; 251/205

[56] References Cited
UNITED STATES PATENTS

| 316,626 | 4/1885 | Jackson | 137/501 |
| 1,290,122 | 1/1919 | Donovan et al. | 137/501X |
| 2,343,375 | 3/1944 | Herman | 137/501X |
| 2,592,380 | 4/1952 | Beckett | 137/501 |
| 2,646,070 | 7/1953 | Holland | 137/494 |
| 2,718,265 | 9/1955 | Conrad | 137/494X |
| 3,338,263 | 8/1967 | Altmeppen et al. | 137/494X |
| 3,343,217 | 9/1967 | Daubenberger | 137/494X |

*Primary Examiner*—M. Cary Nelson
*Assistant Examiner*—Robert J. Miller
*Attorney*—McGlew and Toren ABSTRACT: An automatic flow control valve is made up of a housing forming a valve chamber and a separate piston cylinder with a valve axially positionable within the valve chamber and piston cylinder for maintaining the outlet flow rate at a constant level regardless of any pressure changes in the liquid being supplied to the valve. The valve has a frustoconically shaped section positioned within a similarly shaped part of the valve chamber so that as the valve is displaced there are no significant changes in the cross-sectional area of the flow passageway of the liquid through the valve which could cause cavitation or vortical flow. An adjustable throttle valve, positionable between a fully opened and fully closed position, is located at the outlet from the valve. The housing has several passageways for supplying pressurized liquid to various locations within the valve chamber and the piston cylinder to regulate the position of the valve within the housing.

PATENTED JAN 12 1971　3,554,222

INVENTORS
SHISO KIHARA
HIROSHI NOSAKA
TAKUJI KOYAMA

BY McGlew and Toren
ATTORNEY

AUTOMATIC FLOW CONTROL VALVE

SUMMARY OF THE INVENTION

The present invention is directed to automatic flow control valves and, more particularly, it is concerned with the configuration of a spool valve within the valve chamber to avoid any sharp changes in the cross-sectional area of the flow passage through the valve which might cause cavitation or vortical flow.

In the past, it has been known to use an automatic flow control valve having an adjustable throttle installed at its outlet for regulating flow through the valve and for maintaining a constant flow rate irrespective of any pressure differences developed within the valve. In this type of valve the pressurized fluid was admitted to separate parts of the valve chamber containing the valve for properly positioning the valve member as the pressure varied to attain the desired outlet flow conditions. However, as the valve was displaced within the housing as a result of changes in the pressure, sudden changes occurred in the cross-sectional area of the flow path of the fluid through the valve. Because of these changes, cavitation and vortical flow developed which resulted in undesirable noise characteristics. Since valves of this type are employed in submarines it is important to avoid any situation which would cause a noise level that could be used in tracing the location of the submarine by sonar means.

Accordingly, it is the primary object of the present invention to provide a valve construction which permits the passage of a pressurized fluid through a valve without encountering the problems of cavitation and vortical flow experienced in valves presently in use.

Another object of the invention is to utilize a frustoconically shaped valve positioned within a similarly shaped valve chamber so that as the valve is positioned axially due to pressure differences no sudden changes occur in the cross-sectional area of the flow passages through the valve which would cause cavitation or vortical flow.

Still another object of the invention is to provide separate passageways within the valve housing interconnecting the inlet and main flow passage through the valve with various parts of the valve chamber so that pressure differences in the liquid flowing through the valve can be adequately compensated to assure the desired conditions in the discharge of the fluid from the valve.

Therefore, in accordance with the present invention, an automatic flow control valve is made up of a valve housing and a spool valve which is axially positionable within the housing. The housing is formed to provide an axially extending valve chamber and a separate piston cylinder in alignment with the valve chamber. A portion of the valve chamber has a frustoconically shaped surface tapering outwardly from an inlet end to an outlet end. Extending axially from the outlet end of the frustoconical part is a cylindrical part. At the smaller diameter end of the frustoconical part an opening is provided in the housing which communicates with the cylindrically shaped piston cylinder.

The spool valve is formed of a number of interconnected parts and extends from the valve chamber through the opening in the housing into the piston cylinder. Within the valve chamber, the spool valve has a frustoconical part, the surfaces of which are formed at an angle similar to the frustoconical surfaces of the valve chamber. Further, the opposed frustoconical surfaces are spaced apart providing a throat section or an annular flow passageway leading from the smaller diameter to the larger diameter end of the valve. From the smaller diameter end of the frustoconical part, a cylindrically shaped extension passes through the opening in the housing into the piston cylinder and a piston is formed on the end of the extension and is slidable positionable within the cylinder. At the opposite or larger diameter end of the frustoconical part, a cylindrically shaped part extends axially through the valve chamber. At the end of the spool valve within the valve chamber an axially extending recess is formed within the cylindrically shaped part and has a diameter approximately equal to the diameter of the smaller diameter end of the frustoconical part. A projection extends axially from the end of the housing into the recess formed in the spool valve for acting as a guide in slidably positioning the spool valve within the valve chamber.

An inlet passageway is located in the housing at the smaller diameter end of the frustoconical part of the valve and an outlet passageway is provided at the larger diameter end of the valve. Within the outlet passageway an adjustable throttle valve is positioned and can be moved between a fully opened and a fully closed position for regulating flow from the valve. The pressurized fluid enters through the inlet passageway, flows through the annular passageway shaped or throat formed between the frustoconically shaped surfaces on the valve and the valve chamber, and then passes into the outlet passageways flowing past the adjustable throttle valve to the outlet from the valve.

The piston cylinder is divided by the piston into a pair of chambers of variable volume depending on the position of the piston on the end of the spool valve. In one of the chambers in the piston cylinder a spring member extends between the housing and the piston for biasing the spool valve in the opening direction.

Within the housing, an auxiliary inlet passageway is connected at its inlet end to the inlet passageway through the valve and extends through the housing to the end of the valve chamber within which the cylindrically shaped part of the valve is located. The pressurized fluid passing through this auxiliary inlet passageway affords a dampening effect on the end of the valve so that the pressure on the spool valve acting in the closing direction can be damped by the pressure applied on the end of the valve formed by the cylindrically shaped part. A fixed throttle means is provided at the outlet from the auxiliary inlet passageway into the end of the valve chamber. From the end of the valve chamber the pressurized fluid is discharged through an outlet opening which also contains a fixed throttle means.

To supply the pressurized fluid into the chambers in the piston cylinder a pair of auxiliary outlet passageways are provided each connected to a different one of the chambers. One of the auxiliary outlet passageways is connected to the outlet passageway upstream from the adjustable throttle valve and extends into one chamber and acts on the piston for biasing the valve in the closing direction. The other auxiliary outlet passageway is connected to the outlet passageway on the downstream side of the throttle valve and communicates at its opposite end with the other chamber of the piston cylinder so that the pressurized fluid acts on the piston to displace the valve in the opening direction.

At the larger diameter end of the flow passage between the valve and the valve chamber an opening extends through the valve and communicates with the recess formed in the end of the valve. Accordingly, the pressurized fluid flowing from the outlet end of the valve flow paths enters into the recess and acts on the surface of the valve for urging it in the closing direction in opposition to the action of the pressurized fluid which urges the valve in the opening direction. In operation, as the valve is displaced axially within the housing, there is no location at which sudden cross-sectional area changes take place so that the problems of cavitation vortical flow experienced in prior art valves is avoided.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
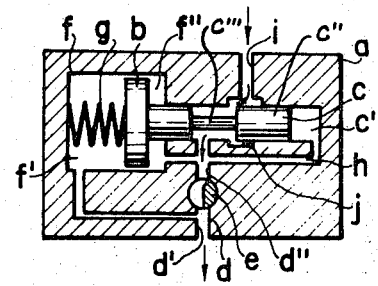
FIG. 1 is a longitudinal cross sectional view of a prior art valve.

In FIG. 1 a conventional automatic flow control valve is shown in a somewhat schematic arrangement comprised of a valve body $a$ and a spool valve $c$ axially displaceable within the valve body. The valve body $a$ is arranged to provide a valve chamber $c'$ and a piston cylinder $f$ in communication with one another through an opening formed by the valve body. The valve has a cylindrically shaped part $c''$ slidably positionable within the chamber $c'$. A connector section $c'''$ extends axially from the cylindrical part $c''$ of the valve to a piston $b$ located within the piston cylinder $f$. The piston cylinder $f$ is divided into a pair of chambers $f'$, $f''$ of variable volume by the piston which is axially displaceable with the valve through the cylinder. Located within the chamber $f'$ is a spring member $g$ which biases the piston and in turn the valve $c$, in the opening direction of the valve.

Pressurized fluid, such as a hydraulic fluid, is supplied to the valve through an inlet passageway $i$, passes through the valve chamber $c$, and is discharged from the valve through an outlet passageway $d$. The outlet passageway is located adjacent the piston cylinder $f$ while the cylindrically shaped part of the valve $c''$ is located adjacent the entrance from the inlet passageway $i$ to the valve chamber $c$. In the outlet passageway $d$, an adjustable throttle valve $e$ positioned for regulating the flow of the pressurized fluid through the valve.

Figure 2:
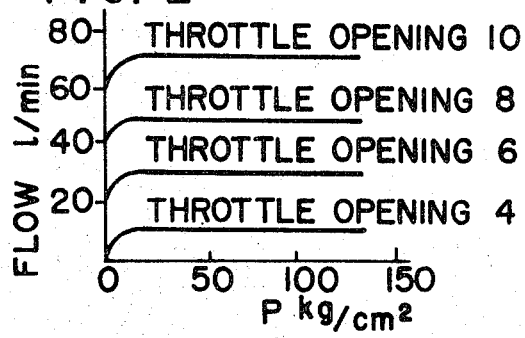
FIG. 2 is a graph exhibiting a number of flow pressure curves for various throttle openings for the valve in FIG. 1.

The valve $c$ and its piston $b$ are axially displaceable within the valve housing or body $a$. In the outlet passageway $d$ from the valve chamber and upstream from the throttle $e$ a pair of auxiliary passageways are provided, one extending through the valve body into a subchamber $c'$ located at the opposite end of the valve chamber from the piston cylinder. The other passageway communicates with the piston chamber $c''$, that is the chamber on the opposite side of the piston $b$ from the spring $g$. As shown in FIG. 2, the valve is capable, by properly adjusting the throttle $e$, of providing a through passage for the pressurized fluid at a constant flow rate regardless of the pressure differences between the pressure of the fluid as it enters the valve chamber $c$ through the inlet passageway $i$ and in the portion $d'$ of the outlet passageway downstream from the throttle. From the portion $d'$ of the outlet passageway another auxiliary passageway is provided connected to the chamber $f'$ of the piston cylinder within which the spring $g$ is located.

As the pressure differences of the fluid flowing through the valve increases, the force acting in the leftward direction, as indicated in FIG. 1, against the right hand surface of piston $b$ and also against the similarly disposed surface of the valve $c$ increases to an extent greater than the forces acting in the opposite direction on the piston and the valve and counteracts the force of the spring $g$ moving the valve in the opening direction. As a result of this pressure differential the cross-sectional area of the flow path through the valve chamber at the port $j$ between the inlet passage $i$ and the valve chamber has a tendency to effect a sudden change in the cross-sectional area causing cavitation and vortical flow which results in the development of undesirable noise, a particularly disadvantageous characteristic when such valves are used in submarines.

To overcome the problems of cavitation and vortical flow experienced in conventional automatic flow valves, the present invention provides a valve construction which, similar to the conventional valve, is axially displaceable, however, the configuration of the valve and the juxtaposed surfaces of the valve chamber are such that no sudden changes in cross-sectional flow area take place and, as a result, the problems previously experienced are avoided.

Figure 3:
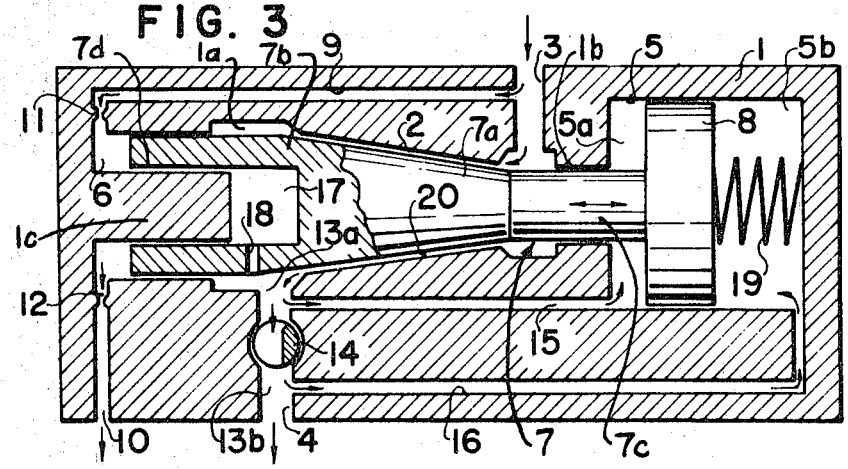
FIG. 3 is a longitudinal cross-sectional view of a valve in accordance with the present invention.

In FIG. 3, an automatic flow control valve is illustrated being comprised of a valve housing 1 arranged to provide a valve chamber $1a$ and a piston cylinder 5 in communication with one another through an opening $1b$. The valve chamber $1a$ has a throat section 2 having a frustoconically shaped surface diverging at angles of about 5 to $5^\circ$ from the inlet toward the outlet end of the valve. An inlet 3 is provided within the valve body 1 and communicates with the valve chamber at the smaller diameter end of the throat section 2. Spaced axially from the inlet is an outlet 4 which communicates with the throat section 2 at the larger diameter end of frustoconically shaped portion of the valve chamber. The opening $1b$ in the housing extends from the end of the valve chamber adjacent the smaller diameter end of its frustoconically shaped section into the piston cylinder 5. From the larger diameter end of the frustoconically shaped portion of the valve chamber a cylindrically shaped section 6 is provided which forms the end of the valve chamber downstream from the location of the outlet passageway 4. Within the cylindrically shaped end 6 of the valve chamber $1a$ a projection $1c$ extends axially inward into the chamber.

A spool valve 7 is positioned within the valve chamber $1a$ and extends into the piston chamber cylinder 5 through the opening $1b$ and has a piston 8 formed on its end within the piston cylinder. Within the valve chamber $1a$ the valve is comprised of a frustoconically shaped part $7a$, a cylindrically shaped part $7b$ extending from the larger diameter end of the frustoconically shaped part and a connector part $7c$ extending from the smaller diameter end of the valve to the piston 8. The spool valve is mounted within the valve chamber $1a$ and the cylinder 5 so that it can slide freely in the axial direction. The frustoconically shaped part $7a$ of the valve is formed at substantially the same cone angle as the oppositely disposed surfaces of the throat 2 of the valve chamber so that the annular passageway formed between the opposed surfaces has the same cross-sectional area for the extent of the throat when the valve is axially displaced through the chamber.

Adjacent the entrance to the inlet passageway 3 an auxiliary inlet passageway 9 extends longitudinally through the housing 1 and communicates at it opposite end with the end portion 6 of the valve chamber. A drain outlet 10 extends from the end portion 6 of the valve chamber for discharging pressurized fluid from the valve. Fixed throttles 11 and 12 are located at the inlet to the end portion 6 of the valve chamber from the passageway 9 and at the outlet from the end portion 6 to the drain outlet 10.

At the larger diameter end of the throat section 2 of the valve chamber an outlet passageway 4 is connected to the outlet 4 from the valve. Within the outlet passageway 13 an adjustable throttle 14 is provided which is capable of regulating the outlet from a fully closed to a fully opened position. The throttle 14 divides the outlet passageway 13 into an upstream section $13a$ and a downstream section $13b$. An auxiliary outlet passageway 15 is connected to the section $13a$ of the outlet passageway and extends through the housing being connected at its opposite end into chamber $5a$ of the piston cylinder 5. On the downstream side of the throttle 14 another auxiliary outlet passageway extends through the valve housing 1 and communicates with the other piston chamber $5b$ within the piston cylinder. Accordingly, a portion of the pressurized fluid flowing through the throat section 2 of the valve chamber is delivered into the piston chamber $5a$ through the auxiliary outlet passageway 15 and a second portion of the pressurized fluid at a lower pressure after it has passed through the throttle 14 is conveyed through the auxiliary outlet passageway 16 into the piston chamber $5b$.

At the opposite end of the spool valve 7 from the piston b, a cylindrically shaped recess 7d is provided which fits in sliding engagement with the projection 1c of the housing. The diameter of the recess 7d corresponds to the diameter of the smaller diameter end of the frustoconical part 7a of the valve and a chamber 17 is formed by the recess. An opening 18 extends through the end part of the valve containing the recess 7d and communicates between the chamber 17 and the end of the throat section 2 to which the outlet passageway is connected. Accordingly, the pressurized fluid flowing through the annular passageway formed by the throat section 2 and the frustoconical part 7a of the valve flows through the opening 18 into the chamber 17 and acts against the surface of the valve within the chamber for urging it toward the piston cylinder end of the valve body.

Within the chamber 5b of the piston cylinder 5 a spring 19 extends between the surface of the valve housing and the adjacent surface of the piston 8 for urging the piston and the valve in the leftward or opening direction, that is, toward the enlarged end of the valve. In the embodiment shown in FIG. 3, the action of the spring 19 forces the valve in the leftward direction when no pressurized fluid is being supplied at the inlet 3 so that the valve is shifted to the left and the port or passageway 20 formed between the throat 2 and the frustoconical part 7a of the valve is opened fully.

When the valve is to be used, the adjustable throttle 14 is set at an opening to obtain the proper flow of the fluid from the valve outlet. A pressurized fluid, such as pressurized oil, is supplied to the inlet 3 and passes into the annular passageway 20 between the throat section 2 of the valve housing and the frustoconically shaped part 7a of the valve and enters the upstream portion 13a of the outlet passageway 13. From the portion 13a of the outlet passageway 13, a part of the pressurized fluid flows through the auxiliary outlet passageway 15 into the piston chamber 5a and acts against the piston 8 for moving the valve in the rightward direction, that is, in the closing direction. Similarly, another part of the pressurized fluid flows through the opening 18 in the valve into the chamber 17 and also acts against the transverse surface at the base of the recess 7d for urging the valve in the rightward direction. The balance of the pressurized fluid not diverted from the upstream section 13a of the outlet passageway 13 flows through the throttle 14 into the downstream section 13b of the outlet passageway. In the downstream section another part of the pressurized fluid is conveyed through the auxiliary outlet passageway 16 into the piston chamber 5b which also contain the spring 19. Within the chamber 5b the pressurized fluid, at a reduced pressure after having passed through the throttle 14 acts against the piston 8 for cooperating with the spring 19 and urging the piston and the valve in the leftward direction for counterbalancing the forces of the pressurized fluid acting to the right. Additionally, a portion of the pressurized fluid delivered at the inlet 3 flows through the passageway 9 into the end portion 6 of the valve chamber and acts against the enlarged end of the valve also directing the valve in the rightward or closing direction. As the pressurized fluid enters the end portion 6 it passes a fixed throttle 11 and in flowing out of the end portion 6 it passes through another fixed throttle 12 before being discharged through the drain port 10.

Due to the location from which the pressurized fluid is supplied into the piston chamber 5a, and the chamber 17 within the recess in the valve, the fluid has a higher pressure than that delivered into the other piston chamber 5b which is taken from a location downstream from the one which supplies piston chamber a and chamber 17. Due to the increased pressure in the rightward direction, the opening force exerted on the valve by the spring 19 is overcome, to some extent, by the product of the pressure difference multiplied by the cross-sectional area of the piston. As the valve is moved in the rightward or closing direction, the space between the opposed surfaces of the throat section 2 of the valve chamber and the frustoconically shaped part 7a of the valve is reduced. As the pressure of the fluid being delivered through the inlet 3 increases, the pressure within the piston chamber 5a and within the chamber 17 correspondingly increases and continues to move the spool valve 7 and the piston 8 in the rightward direction into a new position of equilibrium so that the pressurized fluid being discharged from the exit 4 can be maintained at a given rate of flow regardless of the flow rate of the fluid being supplied to the valve.

As the pressurized fluid flows through the annular passageway 20, it exerts a force against the conically shaped part 7a of the valve under the influence of static and dynamic pressure tending to move the valve in the leftward or opening direction, however, the pressurized fluid bypassed through the auxiliary inlet passageway 9 to the end portion 6 of the valve chamber provides a corresponding pressure acting in the rightward or closing direction of the valve and affords a balancing or dampening effect which relieves the valve 3 from the influence of static and dynamic pressure acting on the valve within the passageway 20.

As explained previously, the flow control valve illustrated in FIG. 3, can discharge fluid from the exit 4 at a given flow rate regardless of the pressure of the fluid supplied at the inlet 3 and this flow rate is established by properly setting the opening of the adjustable throttle 14 within the outlet passageway 13.

Because of the opposed frustoconically shaped surfaces which define the passageway 20 through the throat section of the valve the valve chamber is free of any obstacle or obstruction which would cause a drastic change in the cross-sectional area of the flow path of the fluid through the valve and, as a result, cavitation and vortical flow are avoided and the possibility of noise being caused by such action is greatly minimized.

Figure 4:
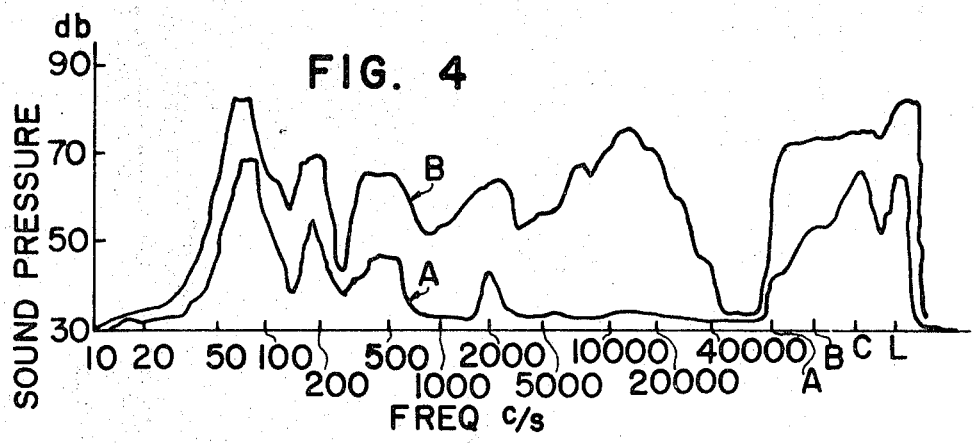
FIG. 4 is a graph containing the curves of the noise characteristics of the valve indicated in FIG. 1 and of the valve embodying the present invention as illustrated in FIG. 3.

In FIG. 4, a pair of curves A, B are shown, one curve plotting the noise characteristics of the valve in accordance with the present invention when the pressurized fluid is supplied at a pressure of $150 kg/cm^2$ and the flow rate is set at 150 l/mn and the other curve plotting similar characteristics for a conventional automatic flow control valve, as exhibited in FIG. 1. As can be clearly seen from these curves, curve A, showing the noise characteristics of the present invention, gives better results than curve B displaying the noise characteristic of a conventional valve. The present invention provides a lower level of noise throughout all of its frequency range and the difference in the noise level is particularly noticeable above the frequency range of 700c/s.

Because of the low noise level provided by the present invention it is particularly recommended for use in submarines in which extreme care is required against causing any sound which might be capable of being detected by the sonar of an enemy craft, such as the frequency range of 4000—5000c/s. In the embodiment described above, the chamber 17 within the recess in the end of the valve can be eliminated with the end portion 6 remaining and the drain port 10 being connected with the downstream section 13b of the outlet passageway 13 in a case where the pressure of the fluid at the exit 4 is at or approximately at atmospheric pressure.

An automatic flow control valve having similar performance characteristics can be provided by replacing the fixed throttle 11 at the entrance to the chamber section 8 with a poppet valve shaped safety valve which remains closed until the fluid within the auxiliary inlet passageway rises to a given value and by replacing the fixed throttle valve at the outlet from the end portion 6 with a needle shaped variable throttle.

We claim:

1. An automatic flow control valve comprising a valve housing forming an axially extending valve chamber and a separate piston cylinder arranged in alignment therewith, an axially extending part of the valve chamber having a frustoconically shaped throat section, a spool valve having a valve part positioned within the valve chamber and an extension part positioned within the piston cylinder, said spool valve being slidably positionable within the valve chamber and the piston cylinder, said valve part comprising an axially extending frustoconical section with the frustoconical section with the surface thereof and the surface of the throat section in said valve chamber being disposed at approximately the same angle to the axis of the valve chamber and the frustoconical surfaces of each being spaced apart forming a annular flow passageway of variable width therebetween in dependence on the position of said valve within the valve chamber, a transverse surface on said valve part adjacent the larger diameter end of said frustoconical part, said extension part extending from said valve part into the piston cylinder, said extension part comprising a piston positioned within and axially displaceable through the piston cylinder, means for biasing said spool valve in the opening direction, said housing having an inlet passageway therein adjacent the smaller diameter end of the throat section of said valve chamber for supplying a pressurized fluid to the annular passageway about the frustoconically shaped part of the valve, said housing having an outlet passageway extending from the larger diameter end of the throat section of said valve chamber for discharging pressurized fluid after its passage through the annular passageway, an adjustable throttle valve positioned in said outlet passageway, and a secondary inlet passageway within said valve housing communicating at one end with said inlet passageway and at its opposite end with the portion of said valve chamber containing said transverse surface for supplying pressurized fluid thereto for acting against the transverse surface and counteracting the forces of said pressurized fluid acting on the conically shaped part of said valve and directing said valve in the opening direction.

2. An automatic flow control valve, as set forth in claim 1, wherein said piston on said spool valve divides the piston cylinder into a pair of variable volume chambers, a first auxiliary outlet passageway communicating at one end with said outlet passageway upstream from said throttle valve and at the other end with one of said chambers in said piston cylinder for supplying pressurized fluid thereto for urging said piston in the closing direction of said valve, and a second auxiliary outlet passageway communicating at one end with said outlet passageway downstream from said throttle valve and at the other end with the other one of said chambers in said piston cylinder for supplying pressurized fluid thereto for urging said piston in the opening direction of said valve.

3. An automatic flow control valve, as set forth in claim 1, wherein a stationary throttle valve being positioned in said auxiliary inlet passageway at the entrance to the end portion of said valve chamber containing the enlarged end of said valve member, and a second stationary throttle valve being located at the outlet from said end portion.

4. An automatic flow control valve, as set forth in claim 1, wherein said valve chamber having a cylindrically shaped section extending axially from the larger diameter end of said frustoconical section, said transverse surface of said valve being located within the cylindrically shaped section of said valve chamber.

5. An automatic flow control valve, as set forth in claim 4, wherein said valve comprising a cylindrically shaped part extending axially from the larger diameter end of said frustoconically shaped part and being located within the cylindrically shaped end section of said valve chamber.

6. An automatic flow control valve, as set forth in claim 5, wherein said cylindrically shaped part of said valve having an axially extending hollow recess therein extending inwardly from the transverse end surface thereof toward said frustoconical part, and a projection on said housing arranged to extend axially inwardly into the valve chamber and being disposed within the hollow recess for guiding said valve.

7. An automatic flow control valve, as set forth in claim 6, wherein said hollow recess having a diameter substantially equal to the diameter of the smaller end of said frustoconical part, and an opening extending through said valve member communicating between the upstream end of said outlet passageway and said hollow recess for supplying pressurized fluid from the upstream end of said outlet passageway into said hollow recess.

8. An automatic flow control valve, as set forth in claim 1, wherein said valve having a cylindrically shaped connector part extending between said frustoconical part and said piston extending through the opening in said housing formed between the valve chamber and the piston cylinder.

9. An automatic flow control valve, as set forth in claim 1, wherein said means for biasing said valve comprising a spring member within the chamber in the piston cylinder on the side of said piston for urging said valve in the opening direction.